US012659447B2

(12) United States Patent
Godard et al.

(10) Patent No.: US 12,659,447 B2
(45) Date of Patent: ***Jun. 16, 2026

(54) SELF-SUPERVISED TRAINING OF A DEPTH ESTIMATION SYSTEM

(71) Applicant: Niantic Spatial, Inc., San Francisco, CA (US)

(72) Inventors: Clément Godard, London (GB); Oisin Mac Aodha, Los Angeles, CA (US); Michael Firman, London (GB); Gabriel J. Brostow, London (GB)

(73) Assignee: Niantic Spatial, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/636,101

(22) Filed: Apr. 15, 2024

(65) Prior Publication Data

US 2024/0340400 A1     Oct. 10, 2024

Related U.S. Application Data

(63) Continuation of application No. 17/354,517, filed on Jun. 22, 2021, now Pat. No. 11,991,342, which is a
(Continued)

(51) Int. Cl.
   *H04N 13/271*     (2018.01)
   *G06T 7/579*      (2017.01)
   (Continued)

(52) U.S. Cl.
   CPC ........... *H04N 13/271* (2018.05); *G06T 7/579* (2017.01); *G06T 7/593* (2017.01); *G06T 7/73* (2017.01);
   (Continued)

(58) Field of Classification Search
   CPC ......... H04N 13/271; H04N 2013/0081; H04N 2013/0088; H04N 13/239; G06T 7/579;
   (Continued)

(56)                References Cited

U.S. PATENT DOCUMENTS 11,044,462 B2   6/2021   Watson et al.
11,082,681 B2   8/2021   Godard et al.
                (Continued)

FOREIGN PATENT DOCUMENTS

CN      102223553 A    10/2011
CN      107067465 A     8/2017
                (Continued)

OTHER PUBLICATIONS

China National Intellectual Property Administration, Office Action, CN Patent Application No. 201980047649.X, Oct. 13, 2021, 15 pages.

(Continued)

*Primary Examiner* — Wassim Mahrouka
(74) *Attorney, Agent, or Firm* — Fenwick & West LLP

(57)                ABSTRACT

A method for training a depth estimation model and methods for use thereof are described. Images are acquired and input into a depth model to extract a depth map for each of the plurality of images based on parameters of the depth model. The method includes inputting the images into a pose decoder to extract a pose for each image. The method includes generating a plurality of synthetic frames based on the depth map and the pose for each image. The method includes calculating a loss value with an input scale occlusion and motion aware loss function based on a comparison of the synthetic frames and the images. The method includes adjusting the plurality of parameters of the depth model (Continued)

based on the loss value. The trained model can receive an image of a scene and generate a depth map of the scene according to the image.

21 Claims, 7 Drawing Sheets

Related U.S. Application Data continuation of application No. 16/413,907, filed on May 16, 2019, now Pat. No. 11,082,681.

(60) Provisional application No. 62/673,045, filed on May 17, 2018.

(51) Int. Cl.

| | | |
|---|---|---|
| *G06T 7/593* | (2017.01) | |
| *G06T 7/73* | (2017.01) | |
| *H04N 13/00* | (2018.01) | |

(52) U.S. Cl.
CPC .............. *G06T 2207/10016* (2013.01); *G06T 2207/10028* (2013.01); *G06T 2207/20081* (2013.01); *H04N 2013/0081* (2013.01); *H04N 2013/0088* (2013.01)

(58) Field of Classification Search
CPC . G06T 7/593; G06T 7/73; G06T 2207/10016; G06T 2207/10028; G06T 2207/20081; G06T 2207/20084; G06T 2207/30244; G06T 7/30; G06T 7/97
See application file for complete search history.

(56) References Cited

U.S. PATENT DOCUMENTS

| | | | | |
|---|---|---|---|---|
| 2013/0077820 | A1 | 3/2013 | Marais et al. | |
| 2015/0063681 | A1 | 3/2015 | Bhardwaj et al. | |
| 2015/0302665 | A1 | 10/2015 | Miller | |
| 2016/0335795 | A1 | 11/2016 | Flynn et al. | |
| 2017/0364771 | A1 | 12/2017 | Pinheiro et al. | |
| 2018/0053056 | A1 | 2/2018 | Rabinovich et al. | |
| 2018/0059679 | A1* | 3/2018 | Taimouri ................ | G06N 3/08 |
| 2019/0012799 | A1 | 1/2019 | Tsurumi | |
| 2019/0035165 | A1 | 1/2019 | Gausebeck | |
| 2019/0139179 | A1 | 5/2019 | Wang et al. | |
| 2019/0325597 | A1 | 10/2019 | Chakravarty et al. | |
| 2020/0013176 | A1 | 1/2020 | Kang et al. | |
| 2020/0258249 | A1 | 8/2020 | Angelova et al. | |

FOREIGN PATENT DOCUMENTS

| | | | |
|---|---|---|---|
| CN | 107204010 | A | 9/2017 |
| CN | 107438866 | A | 12/2017 |
| CN | 107578436 | A | 1/2018 |
| CN | 107767413 | A | 3/2018 |
| CN | 107909150 | A | 4/2018 |
| CN | 108629800 | A | 10/2018 |
| CN | 109191514 | A | 1/2019 |
| JP | 2011-188358 | A | 9/2011 |
| JP | 2015-087851 | A | 5/2015 |
| JP | 2016-143076 | A | 8/2016 |
| JP | 2016-148588 | A | 8/2016 |
| JP | 2017-129904 | A | 7/2017 |
| KR | 10-2015-0140392 | A | 12/2015 |
| KR | 10-2017-0120639 | A | 10/2017 |
| TW | 201842478 | A | 12/2018 |
| WO | WO 2018/046964 | A1 | 3/2018 |

OTHER PUBLICATIONS

China National Intellectual Property Administration, Office Action, CN Patent Application No. 202080005441.4, Nov. 1, 2021, 12 pages.
European Patent Office, Extended European Search Report and Opinion, EP Patent Application No. 19802580.1, May 7, 2021, nine pages.
Garg, R. et al., "Unsupervised cnn for single view depth estimation: Geometry to the rescue," European Conference on Computer Vision, Oct. 8, 2016, pp. 740-756.
Godard, C. et al., "Unsupervised monocular depth estimation with left-right consistency," Proceedings of the IEEE Conference on Computer Vision and Pattern Recognition, 2017, pp. 270-279.
Goddard, C. et al., "Digging into Self-Supervised Monocular Depth Estimation," arXiv preprint arXiv:1806.01260, 2018, 18 pages.
IP Australia, Examination Report, AU Patent Application No. 2021206838, Aug. 8, 2022, four pages.
IP Australia, Examination Report, AU Patent Application No. 2020266341, Dec. 16, 2020, seven pages.
Japan Patent Office, Office Action, JP Patent Application No. 2020-560813, Aug. 10, 2021, four pages.
Japan Patent Office, Office Action, JP Patent Application No. 2020-564565, Sep. 13, 2022, eight pages.
Kuznietsov, Y. et al., 'Semi-supervised deep learning for monocular depth map prediction', arXiv:1702.002706, May 9, 2017, pp. 1-14.
PCT International Search Report and Written Opinion, PCT Application No. PCT/US2019/032616, Sep. 26, 2019, 12 pages.
PCT International Search Report and Written Opinion, PCT Application No. PCT/IB2020/054170, Jul. 27, 2020, nine pages.
Taiwan Intellectual Property Administration, Office Action, TW Patent Application No. 109114835, Sep. 21, 2023, 20 pages.
Taiwan Intellectual Property Administration, Office Action, TW Patent Application No. 108117215, May 3, 2022, seven pages.
Uhrig, J. et al., "DeMON: Depth and Motion Network for Learning Monocular Stereo," The IEEE Conference on Computer Vision and Pattern Recognition (CVPR), Jul. 26, 2017, pp. 5038-5047.
United States Office Action, U.S. Appl. No. 16/413,907, Sep. 18, 2020, nine pages.
United States Office Action, U.S. Appl. No. 17/213,634, Oct. 14, 2021, 10 pages.
United States Office Action, U.S. Appl. No. 17/696,529, Dec. 8, 2022, nine pages.
Wang, R. et al., "Stereo DSO: Large-Scale Direct Sparse Visual Odometry with Stereo Cameras," arXiv:1708.07878, Aug. 25, 2017, pp. 1-15.
Xie, J. et al., "Deep3D: Fully Automatic 2D-to-3D Video Conversion with Deep Convolution al Neural Networks," European Conference on Computer Vision, Oct. 2016, pp. 1-16.
Yang, N. et al., "Deep Virtual Stereo Odometry: Leveraging Deep Depth Prediction for Monocular Direct Sparse Odometry," arXiv:1807. 02570, Jul. 25, 2018, pp. 1-17.
Zhou, T. et al., "Unsupervised Learning of Depth and Ego-Motion from Video," The IEEE Conference on Computer Vision and Pattern Recognition (CVPR), Jul. 26, 2017, pp. 1851-1858.
United States Office Action, U.S. Appl. No. 17/354,517, Mar. 16, 2023, 12 pages.
United States Office Action, U.S. Appl. No. 17/354,517, Oct. 20, 2023, seven pages.
Japan Patent Office, Office Action, JP Patent Application No. 2020-572883, Aug. 10, 2021, four pages.

* cited by examiner

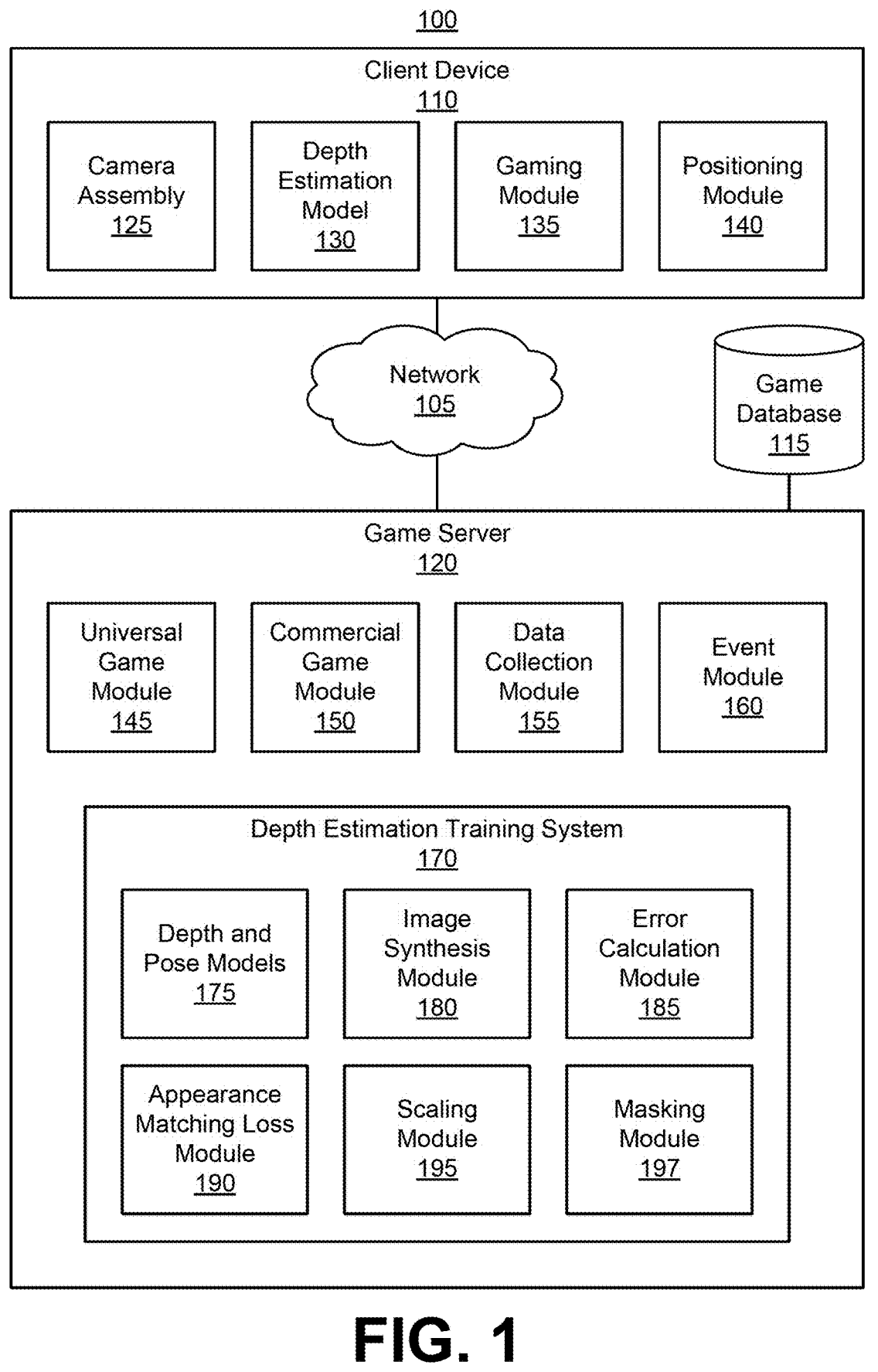

100

Client Device
110

| Camera Assembly 125 | Depth Estimation Model 130 | Gaming Module 135 | Positioning Module 140 |

Network 105

Game Database 115

Game Server
120

| Universal Game Module 145 | Commercial Game Module 150 | Data Collection Module 155 | Event Module 160 |

Depth Estimation Training System
170

| Depth and Pose Models 175 | Image Synthesis Module 180 | Error Calculation Module 185 |

| Appearance Matching Loss Module 190 | Scaling Module 195 | Masking Module 197 |

FIG. 1

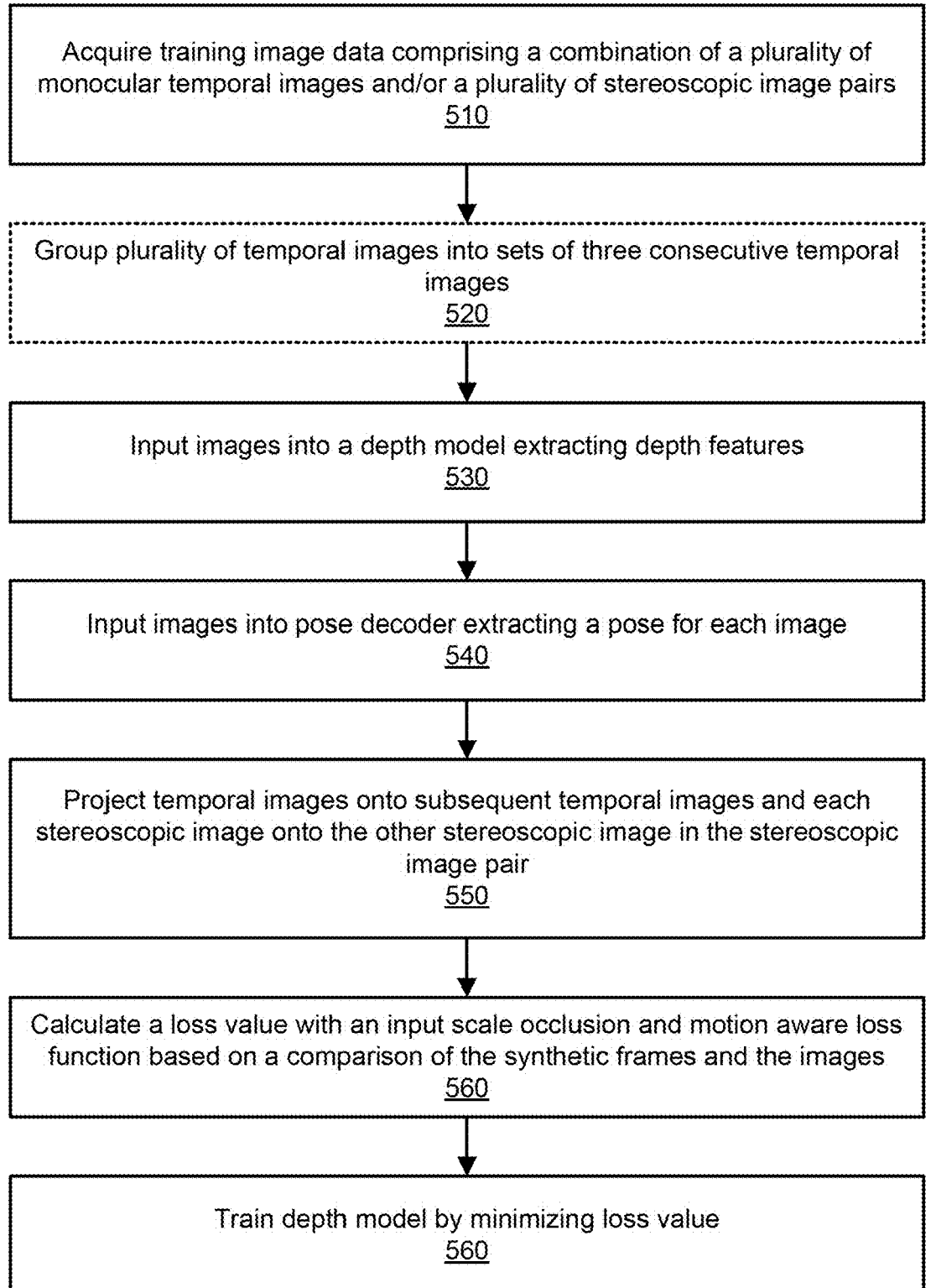

Training of Depth
Estimation System
500

Acquire training image data comprising a combination of a plurality of
monocular temporal images and/or a plurality of stereoscopic image pairs
510

Group plurality of temporal images into sets of three consecutive temporal
images
520

Input images into a depth model extracting depth features
530

Input images into pose decoder extracting a pose for each image
540

Project temporal images onto subsequent temporal images and each
stereoscopic image onto the other stereoscopic image in the stereoscopic
image pair
550

Calculate a loss value with an input scale occlusion and motion aware loss
function based on a comparison of the synthetic frames and the images
560

Train depth model by minimizing loss value
560

FIG. 5

Depth Estimation
600

Receive an image of a scene
610

Input the image of the scene into a trained depth estimation model
620

Generate, by the trained depth estimation model, a depth map of the scene corresponding to the image of the scene
630

Generate virtual content based on the depth map of the scene
640

Display the image of the scene augmented with the generated virtual content
650

700

SELF-SUPERVISED TRAINING OF A DEPTH ESTIMATION SYSTEM

CROSS REFERENCE TO RELATED APPLICATIONS

This application is a continuation of U.S. patent application Ser. No. 17/354,517, filed Jun. 22, 2021, and issued as U.S. Pat. No. 11,991,342, which is a continuation of U.S. patent application Ser. No. 16/413,907, filed May 16, 2019, and issued as U.S. Pat. No. 11,082,681 on Aug. 3, 2021, which claims priority to and the benefit of U.S. Provisional Patent Application No. 62/673,045 filed on May 17, 2018, each of which is incorporated herein by reference in its entirety.

BACKGROUND

Technical Field

The subject matter described generally relates to estimating a depth map from a single color input image, and in particular to a machine-learned model for estimating the depth map trained using video data and/or stereoscopic image data.

Problem

Depth sensing has applications in both navigation and scene understanding. Many methods use trained models or networks to determine a depth map from a single color input image. There are a few methods that use different kinds of training data for training the depth estimation system. A depth estimation system may be trained using a detection and ranging system to establish a ground truth depth for objects in an environment (i.e., radio detecting and ranging (RADAR), light detection and ranging (LIDAR), etc.) paired with images taken of the same scene by a camera. Although detection and ranging systems can provide a ground truth of depth of objects, constantly utilizing detection and ranging systems to sense depth of many different environments can be a costly endeavor in time and resources. Moreover, detection and ranging systems are unable to determine depth of some objects that may have material properties (e.g., reflective objects) that render them undetectable by the detection and ranging systems.

Another method of training a depth estimation system utilizes stereoscopic image pairs of the same scene. To capture stereoscopic image pairs at a single temporal instance depends on using two cameras focused on the same scene but located some distance apart. The depth estimation system operates through projecting from one of the stereoscopic images to the other stereoscopic image in the stereoscopic image pair. In order to project from one to the other, the depth estimation system considers the current stereoscopic image in addition to a disparity—a scaled inverse of depth—and the relative transform between the physical locations of the two cameras used to take the stereoscopic image pair. In minimizing photometric reconstruction error of a projection compared to its captured stereoscopic image, the depth estimation system can determine depth of the scene.

Some more novel methods train a depth estimation system utilizing monocular video data of an ever changing scene. The depth estimation system trains by projecting from one temporal image in the monocular video data to a subsequent temporal image while minimizing a photometric reconstruction error. However, such systems may inaccurately account for objects coming into or going out of view from one temporal image to another which leads to artifacts in the depth map and around the depth map's border. Moreover, traditional systems currently input low-resolution images for determining depth maps prior to upsampling the depth maps, which is prone to depth upsampling artifacts.

SUMMARY

The present disclosure describes a method for training and using a depth estimation model. To train the model, a system acquires images. The system inputs the images into a depth model to extract a depth map for each image based on parameters of the depth model. The system inputs the images into a pose decoder to extract a pose for each image. The system generates synthetic frames based on the depth map and the pose for each image. The system calculates a loss value with an input scale occlusion and motion aware loss function based on a comparison of the synthetic frames and the images. The input scale occlusion and motion aware loss function calculates a loss value for use in refining the parameters the depth model. The loss function includes a calculation of the photometric reconstruction error per pixel between a synthetic frame and an input image. The loss function may also take into account a minimum photometric reconstruction error between two synthetic frames projected from temporal images from monocular video that are temporally adjacent to another image. Upsampled depth features may also be used during generation of the synthetic frames which would affect the appearance matching loss calculations. The loss function may also implement a mask generated that discounts static features in images when calculating the loss value. The system adjusts the parameters of the depth model based on the loss value. With the trained model, a device can receive an image of a scene and generate a depth map of the scene according to the image.

In some embodiments, the depth estimation model trains with image data comprising monocular video. Each image of the monocular video is captured at a different time and associated with a corresponding timestamp. In an example discussion using a first image with a first timestamp and a second image with a second timestamp, the model uses the first image with the first timestamp from the monocular video to generate a synthetic frame at the second timestamp. The model calculates a photometric reconstruction error between the synthetic frame and the second image with the second timestamp. The model follows the above procedure with other pairs of images from the monocular video having adjacent timestamps. The model adjusts the parameters to minimize the error. In other embodiments, the model trains with image data comprising stereoscopic image pairs, wherein each stereoscopic image pair is captured by a stereoscopic pair of cameras. When generating synthetic frames, the model takes one of the images (e.g., the left image) from a stereoscopic image pair and generates a synthetic frame at the other image (e.g., the right image). The model calculates the photometric reconstruction error between the synthetic frame and the other image. The model adjusts the parameters to minimize the error. In yet other embodiments, the model trains with image data comprising both monocular video and stereoscopic image pairs.

BRIEF DESCRIPTION OF THE DRAWINGS

FIG. 1 illustrates a networked computing environment, in accordance with one or more embodiments.

FIG. 5 is a flowchart describing a general process of training the depth estimation model, in accordance with one or more embodiments.

The Figures (FIGS.) and the following description describe certain embodiments by way of illustration only. One skilled in the art will readily recognize from the following description that alternative embodiments of the structures and methods may be employed without departing from the principles described. Reference will now be made to several embodiments, examples of which are illustrated in the accompanying figures.

DETAILED DESCRIPTION

Exemplary Location-Based Parallel Reality Gaming System

A parallel reality game is a location-based game having a virtual world geography that parallels at least a portion of the real world geography such that player movement and actions in the real world affect actions in the virtual world and vice versa. Those of ordinary skill in the art, using the disclosures provided herein, will understand that the subject matter described is applicable in other situations where determining depth information from image data is desirable. In addition, the inherent flexibility of computer-based systems allows for a great variety of possible configurations, combinations, and divisions of tasks and functionality between and among the components of the system. For instance, the systems and methods according to aspects of the present disclosure can be implemented using a single computing device or across multiple computing devices (e.g., connected in a computer network).

FIG. 1 illustrates a networked computing environment 100, in accordance with one or more embodiments. The networked computing environment 100 provides for the interaction of players in a virtual world having a geography that parallels the real world. In particular, a geographic area in the real world can be linked or mapped directly to a corresponding area in the virtual world. A player can move about in the virtual world by moving to various geographic locations in the real world. For instance, a player's position in the real world can be tracked and used to update the player's position in the virtual world. Typically, the player's position in the real world is determined by finding the location of a client device 110 through which the player is interacting with the virtual world and assuming the player is at the same (or approximately the same) location. For example, in various embodiments, the player may interact with a virtual element if the player's location in the real world is within a threshold distance (e.g., ten meters, twenty meters, etc.) of the real world location that corresponds to the virtual location of the virtual element in the virtual world. For convenience, various embodiments are described with reference to "the player's location" but one of skill in the art will appreciate that such references may refer to the location of the player's client device 110.

Figure 2:
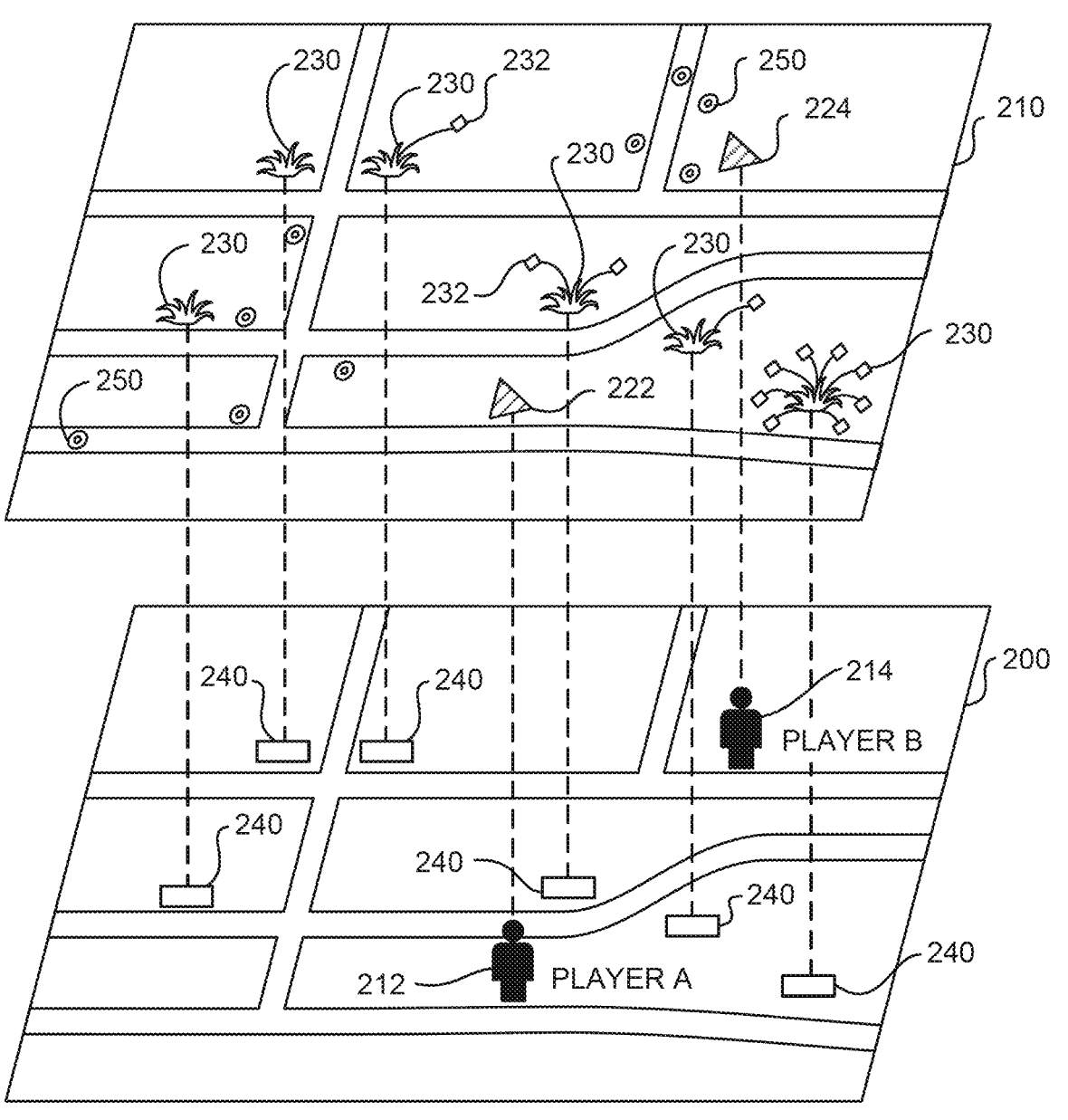
FIG. 2 depicts a representation of a virtual world having a geography that parallels the real world, in accordance with one or more embodiments.

Reference is now made to FIG. 2 which depicts a conceptual diagram of a virtual world 210 that parallels the real world 200 that can act as the game board for players of a parallel reality game, according to one embodiment. As illustrated, the virtual world 210 can include a geography that parallels the geography of the real world 200. In particular, a range of coordinates defining a geographic area or space in the real world 200 is mapped to a corresponding range of coordinates defining a virtual space in the virtual world 210. The range of coordinates in the real world 200 can be associated with a town, neighborhood, city, campus, locale, a country, continent, the entire globe, or other geographic area. Each geographic coordinate in the range of geographic coordinates is mapped to a corresponding coordinate in a virtual space in the virtual world.

A player's position in the virtual world 210 corresponds to the player's position in the real world 200. For instance, the player A located at position 212 in the real world 200 has a corresponding position 222 in the virtual world 210. Similarly, the player B located at position 214 in the real world has a corresponding position 224 in the virtual world. As the players move about in a range of geographic coordinates in the real world, the players also move about in the range of coordinates defining the virtual space in the virtual world 210. In particular, a positioning system (e.g., a GPS system) associated with a mobile computing device carried by the player can be used to track a player's position as the player navigates the range of geographic coordinates in the real world. Data associated with the player's position in the real world 200 is used to update the player's position in the corresponding range of coordinates defining the virtual space in the virtual world 210. In this manner, players can navigate along a continuous track in the range of coordinates defining the virtual space in the virtual world 210 by simply traveling among the corresponding range of geographic coordinates in the real world 200 without having to check in or periodically update location information at specific discrete locations in the real world 200.

The location-based game can include a plurality of game objectives requiring players to travel to and/or interact with various virtual elements and/or virtual objects scattered at various virtual locations in the virtual world. A player can travel to these virtual locations by traveling to the corresponding location of the virtual elements or objects in the real world. For instance, a positioning system can continuously track the position of the player such that as the player continuously navigates the real world, the player also continuously navigates the parallel virtual world. The player can then interact with various virtual elements and/or objects at the specific location to achieve or perform one or more game objectives.

For example, a game objective has players interacting with virtual elements 230 located at various virtual locations in the virtual world 210. These virtual elements 230 can be linked to landmarks, geographic locations, or objects 240 in the real world 200. The real world landmarks or objects 240 can be works of art, monuments, buildings, businesses, libraries, museums, or other suitable real world landmarks or objects. Interactions include capturing, claiming ownership of, using some virtual item, spending some virtual currency, etc. To capture these virtual elements 230, a player must travel to the landmark or geographic location 240 linked to the virtual elements 230 in the real world and must perform any necessary interactions with the virtual elements 230 in the virtual world 210. For example, player A of FIG. 2 may have to travel to a landmark 240 in the real world 200 in order to interact with or capture a virtual element 230 linked with that particular landmark 240. The interaction with the virtual element 230 can require action in the real world, such as taking a photograph and/or verifying, obtaining, or capturing other information about the landmark or object 240 associated with the virtual element 230.

Game objectives may require that players use one or more virtual items that are collected by the players in the location-based game. For instance, the players may travel the virtual world 210 seeking virtual items (e.g. weapons, creatures, power ups, or other items) that can be useful for completing game objectives. These virtual items can be found or collected by traveling to different locations in the real world 200 or by completing various actions in either the virtual world 210 or the real world 200. In the example shown in FIG. 2, a player uses virtual items 232 to capture one or more virtual elements 230. In particular, a player can deploy virtual items 232 at locations in the virtual world 210 proximate or within the virtual elements 230. Deploying one or more virtual items 232 in this manner can result in the capture of the virtual element 230 for the particular player or for the team/faction of the particular player.

In one particular implementation, a player may have to gather virtual energy as part of the parallel reality game. As depicted in FIG. 2, virtual energy 250 can be scattered at different locations in the virtual world 210. A player can collect the virtual energy 250 by traveling to the corresponding location of the virtual energy 250 in the actual world 200. The virtual energy 250 can be used to power virtual items and/or to perform various game objectives in the game. A player that loses all virtual energy 250 can be disconnected from the game.

According to aspects of the present disclosure, the parallel reality game can be a massive multi-player location-based game where every participant in the game shares the same virtual world. The players can be divided into separate teams or factions and can work together to achieve one or more game objectives, such as to capture or claim ownership of a virtual element. In this manner, the parallel reality game can intrinsically be a social game that encourages cooperation among players within the game. Players from opposing teams can work against each other (or sometime collaborate to achieve mutual objectives) during the parallel reality game. A player may use virtual items to attack or impede progress of players on opposing teams. In some cases, players are encouraged to congregate at real world locations for cooperative or interactive events in the parallel reality game. In these cases, the game server seeks to ensure players are indeed physically present and not spoofing.

The parallel reality game can have various features to enhance and encourage game play within the parallel reality game. For instance, players can accumulate a virtual currency or another virtual reward (e.g., virtual tokens, virtual points, virtual material resources, etc.) that can be used throughout the game (e.g., to purchase in-game items, to redeem other items, to craft items, etc.). Players can advance through various levels as the players complete one or more game objectives and gain experience within the game. In some embodiments, players can communicate with one another through one or more communication interfaces provided in the game. Players can also obtain enhanced "powers" or virtual items that can be used to complete game objectives within the game. Those of ordinary skill in the art, using the disclosures provided herein, should understand that various other game features can be included with the parallel reality game without deviating from the scope of the present disclosure.

Referring back FIG. 1, the networked computing environment 100 uses a client-server architecture, where a game server 120 communicates with a client device 110 over a network 105 to provide a parallel reality game to players at the client device 110. The networked computing environment 100 also may include other external systems such as sponsor/advertiser systems or business systems. Although only one client device 110 is illustrated in FIG. 1, any number of clients 110 or other external systems may be connected to the game server 120 over the network 105. Furthermore, the networked computing environment 100 may contain different or additional elements and functionality may be distributed between the client device 110 and the server 120 in a different manner than described below.

A client device 110 can be any portable computing device that can be used by a player to interface with the game server 120. For instance, a client device 110 can be a wireless device, a personal digital assistant (PDA), portable gaming device, cellular phone, smart phone, tablet, navigation system, handheld GPS system, wearable computing device, a display having one or more processors, or other such device. In another instance, the client device 110 includes a conventional computer system, such as a desktop or a laptop computer. Still yet, the client device 110 may be a vehicle with a computing device. In short, a client device 110 can be any computer device or system that can enable a player to interact with the game server 120. As a computing device, the client device 110 can include one or more processors and one or more computer-readable storage media. The computer-readable storage media can store instructions which cause the processor to perform operations. The client device 110 is preferably a portable computing device that can be easily carried or otherwise transported with a player, such as a smartphone or tablet.

The client device 110 communicates with the game server 120 providing the game server 120 with sensory data of a physical environment. The client device 110 includes a camera assembly 125 that captures image data in two dimensions of a scene in the physical environment where the client device 110 is. The client device 110 also includes a depth estimation model 130 that is a machine learning model, e.g., trained by the game server 120. In the embodiment shown in FIG. 1, each client device 110 includes software components such as a gaming module 135 and a positioning module 140. The client device 110 may include various other input/output devices for receiving information from and/or providing information to a player. Example input/output devices include a display screen, a touch screen, a touch pad, data entry keys, speakers, and a microphone suitable for voice recognition. The client device 110 may also include other various sensors for recording data from the client device 110 including but not limited to movement sensors, accelerometers, gyroscopes, other inertial measurement units (IMUs), barometers, positioning systems, thermometers, light sensors, etc. The client device 110 can further include a network interface for providing communications over the network 105. A network interface can include any suitable components for interfacing with one more networks, including for example, transmitters, receivers, ports, controllers, antennas, or other suitable components.

The camera assembly 125 captures image data of a scene of the environment where the client device 110 is in. The camera assembly 125 may utilize a variety of varying photo sensors with varying color capture ranges at varying capture rates. The camera assembly 125 may contain a wide angle lens or a telephoto lens. The camera assembly 125 may be configured to capture single images or video as the image data. Additionally, the orientation of the camera assembly 125 could be parallel to the ground with the camera assembly 125 aimed at the horizon. The camera assembly 125 captures image data and shares the image data with the computing device on the client device 110. The image data can be appended with metadata describing other details of the image data including sensory data (e.g. temperature, brightness of environment) or capture data (e.g. exposure, warmth, shutter speed, focal length, capture time, etc.). The camera assembly 125 can include one or more cameras which can capture image data. In one instance, the camera assembly 125 comprises one camera and is configured to capture monocular image data. In another instance, the camera assembly 125 comprises two cameras and is configured to capture stereoscopic image data. In various other implementations, the camera assembly 125 comprises a plurality of cameras each configured to capture image data.

The depth estimation model 130 receives an input image of a scene and outputs a depth of the scene based on the input image. The depth estimation model 130 is trained by a depth estimation training system and can be updated or adjusted by the depth estimation training system, which is discussed in greater detail below. The received input image may be captured by a camera of the camera assembly 125 or another camera from another client device 110. In some embodiments, the received input image has metadata appended to the image specifying intrinsics of the input image. The intrinsics of an image refer to one or more geometric properties of the camera at a time when the image was captured, e.g., the focal length of the camera when capturing the image, the camera's principal point offset, the skew of the camera, etc. With the intrinsics, the depth estimation model 130 may generate an intrinsic matrix accounting for the intrinsics. In some embodiments, the depth estimation model 130 determines whether the input image is above a threshold resolution. If not, the depth estimation model 130 may upsample the input image to a desired resolution prior to determining the depth map of the scene. The depth estimation model 130 inputs the image (as received or after upsampling) and determines a depth map of the scene. Machine learning algorithms may be implemented in the depth estimation model 130, for training and/or inference.

The gaming module 135 provides a player with an interface to participate in the parallel reality game. The game server 120 transmits game data over the network 105 to the client device 110 for use by the gaming module 135 at the client device 110 to provide local versions of the game to players at locations remote from the game server 120. The game server 120 can include a network interface for providing communications over the network 105. A network interface can include any suitable components for interfacing with one more networks, including for example, transmitters, receivers, ports, controllers, antennas, or other suitable components.

The gaming module 135 executed by the client device 110 provides an interface between a player and the parallel reality game. The gaming module 135 can present a user interface on a display device associated with the client device 110 that displays a virtual world (e.g. renders imagery of the virtual world) associated with the game and allows a user to interact in the virtual world to perform various game objectives. In some other embodiments, the gaming module 135 presents image data from the real world (e.g., captured by the camera assembly 125) augmented with virtual elements from the parallel reality game. In these embodiments, the gaming module 135 may generate virtual content and/or adjust virtual content according to other information received from other components of the client device. For example, the gaming module 135 may adjust a virtual object to be displayed on the user interface according to a depth map (e.g., determined by the depth estimation model 130) of the scene captured in the image data.

The gaming module 135 can also control various other outputs to allow a player to interact with the game without requiring the player to view a display screen. For instance, the gaming module 135 can control various audio, vibratory, or other notifications that allow the player to play the game without looking at the display screen. The gaming module 135 can access game data received from the game server 120 to provide an accurate representation of the game to the user. The gaming module 135 can receive and process player input and provide updates to the game server 120 over the network 105. The gaming module 135 may also generate and/or adjust game content to be displayed by the client device 110. For example, the gaming module 135 may generate a virtual element based on depth information (e.g., as determined by the depth estimation model 130).

The positioning module 140 can be any device or circuitry for monitoring the position of the client device 110. For example, the positioning module 140 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, based on IP address, by using triangulation and/or proximity to cellular towers or Wi-Fi hotspots, and/or other suitable techniques for determining position. The positioning module 140 may further include various other sensors that may aid in accurately positioning the client device 110 location.

As the player moves around with the client device 110 in the real world, the positioning module 140 tracks the position of the player and provides the player position information to the gaming module 135. The gaming module 135 updates the player position in the virtual world associated with the game based on the actual position of the player in the real world. Thus, a player can interact with the virtual world simply by carrying or transporting the client device 110 in the real world. In particular, the location of the player in the virtual world can correspond to the location of the player in the real world. The gaming module 135 can provide player position information to the game server 120 over the network 105. In response, the game server 120 may enact various techniques to verify the client device 110 location to prevent cheaters from spoofing the client device 110 location. It should be understood that location information associated with a player is utilized only if permission is granted after the player has been notified that location information of the player is to be accessed and how the location information is to be utilized in the context of the game (e.g. to update player position in the virtual world). In addition, any location information associated with players will be stored and maintained in a manner to protect player privacy.

The game server 120 can be any computing device and can include one or more processors and one or more computer-readable storage media. The computer-readable storage media can store instructions which cause the processor to perform operations. The game server 120 can include or can be in communication with a game database 115. The game database 115 stores game data used in the parallel reality game to be served or provided to the client(s) 110 over the network 105.

The game data stored in the game database 115 can include: (1) data associated with the virtual world in the parallel reality game (e.g. imagery data used to render the virtual world on a display device, geographic coordinates of locations in the virtual world, etc.); (2) data associated with players of the parallel reality game (e.g. player profiles including but not limited to player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real world objects, landmarks, positions linked to virtual world elements (e.g. location of real world objects/landmarks, description of real world objects/landmarks, relevance of virtual elements linked to real world objects, etc.); (6) Game status (e.g. current number of players, current status of game objectives, player leaderboard, etc.); (7) data associated with player actions/input (e.g. current player positions, past player positions, player moves, player input, player queries, player communications, etc.); and (8) any other data used, related to, or obtained during implementation of the parallel reality game. The game data stored in the game database 115 can be populated either offline or in real time by system administrators and/or by data received from users/players of the system 100, such as from a client device 110 over the network 105.

The game server 120 can be configured to receive requests for game data from a client device 110 (for instance via remote procedure calls (RPCs)) and to respond to those requests via the network 105. For instance, the game server 120 can encode game data in one or more data files and provide the data files to the client device 110. In addition, the game server 120 can be configured to receive game data (e.g. player positions, player actions, player input, etc.) from a client device 110 via the network 105. For instance, the client device 110 can be configured to periodically send player input and other updates to the game server 120, which the game server 120 uses to update game data in the game database 115 to reflect any and all changed conditions for the game.

In the embodiment shown, the server 120 includes a universal gaming module 145, a commercial game module 150, a data collection module 155, an event module 160, and a depth estimation training system 170. As mentioned above, the game server 120 interacts with a game database 115 that may be part of the game server 120 or accessed remotely (e.g., the game database 115 may be a distributed database accessed via the network 105). In other embodiments, the game server 120 contains different and/or additional elements. In addition, the functions may be distributed among the elements in a different manner than described. For instance, the game database 115 can be integrated into the game server 120.

The universal game module 145 hosts the parallel reality game for all players and acts as the authoritative source for the current status of the parallel reality game for all players.

As the host, the universal game module 145 generates game content for presentation to players, e.g., via their respective client devices 110. The universal game module 145 may access the game database 115 to retrieve and/or store game data when hosting the parallel reality game. The universal game module 145 also receives game data from client device 110 (e.g. depth information, player input, player position, player actions, landmark information, etc.) and incorporates the game data received into the overall parallel reality game for all players of the parallel reality game. The universal game module 145 can also manage the delivery of game data to the client device 110 over the network 105. The universal game module 145 may also govern security aspects of client device 110 including but not limited to securing connections between the client device 110 and the game server 120, establishing connections between various client device 110, and verifying the location of the various client device 110.

The commercial game module 150, in embodiments where one is included, can be separate from or a part of the universal game module 145. The commercial game module 150 can manage the inclusion of various game features within the parallel reality game that are linked with a commercial activity in the real world. For instance, the commercial game module 150 can receive requests from external systems such as sponsors/advertisers, businesses, or other entities over the network 105 (via a network interface) to include game features linked with commercial activity in the parallel reality game. The commercial game module 150 can then arrange for the inclusion of these game features in the parallel reality game.

The game server 120 can further include a data collection module 155. The data collection module 155, in embodiments where one is included, can be separate from or a part of the universal game module 145. The data collection module 155 can manage the inclusion of various game features within the parallel reality game that are linked with a data collection activity in the real world. For instance, the data collection module 155 can modify game data stored in the game database 115 to include game features linked with data collection activity in the parallel reality game. The data collection module 155 can also analyze and data collected by players pursuant to the data collection activity and provide the data for access by various platforms.

The event module 160 manages player access to events in the parallel reality game. Although the term "event" is used for convenience, it should be appreciated that this term need not refer to a specific event at a specific location or time. Rather, it may refer to any provision of access-controlled game content where one or more access criteria are used to determine whether players may access that content. Such content may be part of a larger parallel reality game that includes game content with less or no access control or may be a stand-alone, access controlled parallel reality game.

The depth estimation training system 170 trains a depth estimation model, e.g., the depth estimation model 130 provided to the client device 110. The depth estimation training system 170 receives image data for use in training the depth estimation model. Generally speaking, the depth estimation training system 170 processes the image data, inputs the image data into a depth estimation model and a pose estimation model, projects images onto other images as synthetic frames, and iteratively adjusts parameters of the depth estimation model. The depth estimation training system 170 may further define a loss value with an input scale occlusion and motion aware loss function based on a comparison of the synthetic frames and the images which is then minimized when refining the parameters. The loss value can also indicate whether the depth estimation model is sufficiently trained and/or sufficiently accurate in estimating depth information. The loss function may also take into account a minimum photometric reconstruction error between two synthetic frames projected from temporal images from monocular video that are temporally adjacent to another image. Upsampled depth features may also be used during generation of the synthetic frames which would affect the appearance matching loss calculations. The loss function may also implement a mask generated that discounts static features in images when calculating the loss value. Once the depth estimation model is trained, the depth estimation model receives image data and outputs depth information of the environment in the image data. The depth estimation training system 170 provides the trained model to the client device 110. Training by the depth estimation training system 170 will be further described below.

The network 105 can be any type of communications network, such as a local area network (e.g. intranet), wide area network (e.g. Internet), or some combination thereof. The network can also include a direct connection between a client device 110 and the game server 120. In general, communication between the game server 120 and a client device 110 can be carried via a network interface using any type of wired and/or wireless connection, using a variety of communication protocols (e.g. TCP/IP, HTTP, SMTP, FTP), encodings or formats (e.g. HTML, XML, JSON), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

In addition, in situations in which the systems and methods discussed herein access and analyze personal information about users, or make use of personal information, such as location information, the users may be provided with an opportunity to control whether programs or features collect the information and control whether and/or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Exemplary Game Interface

Figure 3:
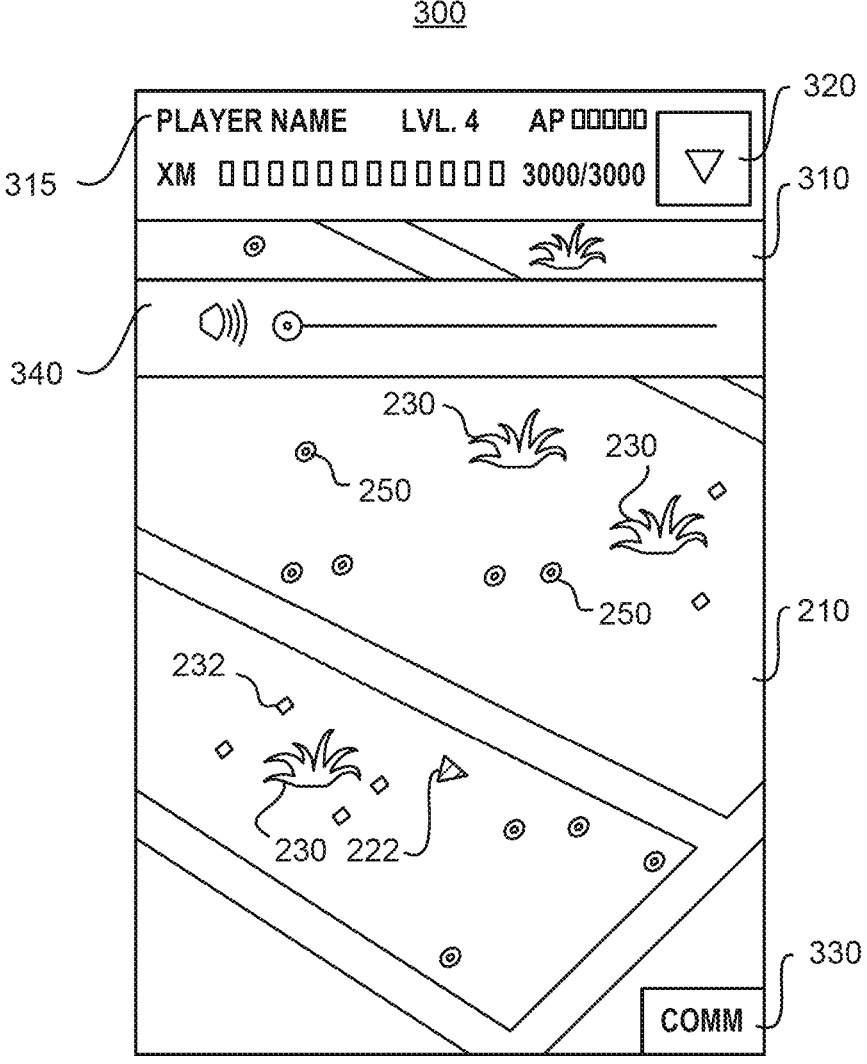
FIG. 3 depicts an exemplary game interface of a parallel reality game, in accordance with one or more embodiments.

FIG. 3 depicts one embodiment of a game interface 300 that can be presented on a display of a client 110 as part of the interface between a player and the virtual world 210. The game interface 300 includes a display window 310 that can be used to display the virtual world 210 and various other aspects of the game, such as player position 222 and the locations of virtual elements 230, virtual items 232, and virtual energy 250 in the virtual world 210. The user interface 300 can also display other information, such as game data information, game communications, player information, client location verification instructions and other information associated with the game. For example, the user interface can display player information 315, such as player name, experience level and other information. The user interface 300 can include a menu 320 for accessing various game settings and other information associated with the game. The user interface 300 can also include a communications interface 330 that enables communications between the game system and the player and between one or more players of the parallel reality game.

According to aspects of the present disclosure, a player can interact with the parallel reality game by simply carrying a client device 110 around in the real world. For instance, a player can play the game by simply accessing an application associated with the parallel reality game on a smartphone and moving about in the real world with the smartphone. In this regard, it is not necessary for the player to continuously view a visual representation of the virtual world on a display screen in order to play the location based game. As a result, the user interface 300 can include a plurality of non-visual elements that allow a user to interact with the game. For instance, the game interface can provide audible notifications to the player when the player is approaching a virtual element or object in the game or when an important event happens in the parallel reality game. A player can control these audible notifications with audio control 340. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

Those of ordinary skill in the art, using the disclosures provided herein, will appreciate that numerous game interface configurations and underlying functionalities will be apparent in light of this disclosure. The present disclosure is not intended to be limited to any one particular configuration.

Depth Estimation Training

The depth estimation training system 170 trains the depth estimation model 130 for use by the client device 110. In the embodiment shown in FIG. 1, the depth estimation training system 170 includes depth and pose models 175, an image synthesis module 180, an error calculation module 185, an appearance matching loss module 190, a scaling module 195, and a masking module 197. In other embodiments, the depth estimation training system 170 may include different and/or additional components, e.g., data stores, feedback modules, smoothing modules etc. For example, a data store may store training data or trained parameters when training the depth and pose models 175. In another example, a smoothing module can process depth maps such as smoothing depth values in the depth map. The depth and pose models 175 include one or more models that receive images and can determine depth features and/or pose of the images. As will be discussed below, the depth and pose models 175 may be configured with parameters for a depth model distinct from parameters for a pose model. Alternatively, the depth and pose models 175 may be configured such that one or more parameters from the pose model is shared with the depth model.

Figure 4:
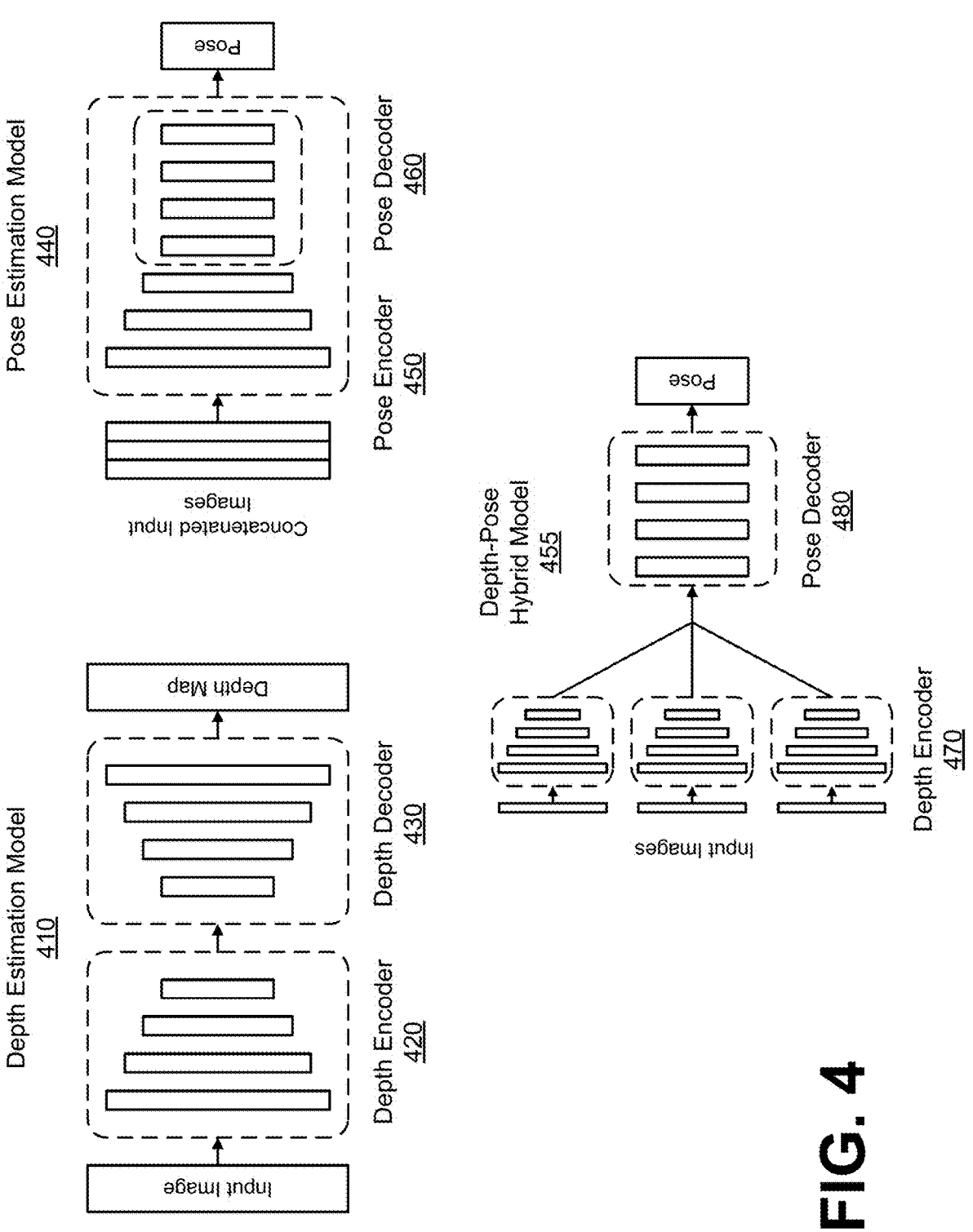
FIG. 4 illustrates a conceptual comparison of using a separate pose estimation model versus a depth-pose hybrid model, in accordance with one or more embodiments.

Referring now to FIG. 4, the depth estimation training system 170 may train a depth estimation model 410 and a pose estimation model 440 separately from one another to be able to determine a depth map of a scene and a pose of an input image from the input image. In this embodiment, the depth estimation model 410 and the pose estimation model 440 operate separately, each using computing time and resources to operate.

The depth estimation model 410 receives an input image to determine a depth map corresponding to that input image. In one embodiment, the depth estimation model 410 feeds the input image through a depth encoder 420 to extract abstract depth features. The depth encoder 420 can extract these features using different machine learning algorithms and techniques. In this illustration, the depth encoder 420 is a convolutional neural network including multiple layers where each subsequent layer reduces dimensionality of features extracted. For example, an input image on the order of 10^6 pixels or data points is reduced to a set of features on the order of 10^5 after the first layer. By the final layer in the depth encoder 420, the abstract depth features could be on the order of 10^4 or smaller. These numbers are provided purely for illustrative purposes. In practice, the depth encoder may have different numbers of layers and the number of pixels and depth features may vary.

In an inverse fashion, the depth decoder 430 comprises multiple layers to increase dimensionality of abstract features. Following the example above, the depth decoder 430 can take the abstract depth features on the order of 10^4 and gradually—over multiple layers—deduce depth at each pixel of the input image. The depth decoder 430 then outputs a depth map wherein each pixel on the depth map corresponds to a distance of the nearest object in the scene that projects to that pixel. In alternative embodiments, the depth decoder 430 outputs a disparity map wherein each pixel on the disparity map corresponds to an inverse of the distance. Throughout this disclosure, principles described in reference to depth maps readily apply in implementations with disparity maps. For example, the input image has captured a tree some unknown distance from the camera at a given pixel. The depth decoder 430 outputs a depth value corresponding to a distance from the camera to the block at that pixel. In some embodiments, the output depth values can be relative to another or intrinsically defined. In other embodiments, the output depth values are up to scale providing real measurements of objects in the scene, e.g., a block is 10 feet away or a building is 25 meters away.

The pose estimation model 440 receives a plurality of concatenated input images to determine a pose for each of the input images. Pose generally refers to a mathematical transformation between perspectives of two images. Herein throughout this disclosure, the pose more generally describes a perspective of an image wherein the perspectives can be used to define the transformation between two images. The concatenated input images are put into a pose encoder 450 which extracts abstract pose features from the concatenated input images. The abstract pose features are then input through a pose decoder 460 which determines a pose for each of the concatenated input images or relative transformation between each pair of input images. The pose encoder 450 may be configured as a convolutional neural network including multiple layers for extracting the abstract pose features and then deducing the pose for each of the concatenated input images.

In an alternative configuration, the depth-pose hybrid model 455 shares parameters from a pose estimation model with a depth model, which reduces overall computation time given less parameters to be trained, among other advantages. In one embodiment, the depth-pose hybrid model 455 is a model that receives one or more images of a scene and determines one or more poses of the images. The depth-pose hybrid model 455 incorporates a depth encoder 470—that may be the depth encoder 420 of the depth estimation model 410—and a pose decoder 480—that may be the pose decoder 460 from the pose estimation model 440. In this embodiment, the depth-pose hybrid model 455 incorporates principles used in the depth estimation model 410 and the pose estimation model 440 and is thus able to reduce overall computing time and resources. Moreover, the depth-pose hybrid model 455 provides an avenue for sharing information between the two models making training easier.

The depth-pose hybrid model 455 utilizes the depth encoder 470 and the pose decoder 480. In one embodiment, the depth-pose hybrid model 455 takes a plurality of input images and feeds each through the depth encoder 470 to extract abstract depth features. The abstract depth features from each input image are then concatenated together prior to being input into the pose decoder 480 resulting in a pose for each of the input images or the relative transformations between two subsequent input images. The depth-pose hybrid model 455 is more computationally efficient than the pose estimation model 440 in extracting a pose for each pair of the input images. The depth-pose hybrid model 455 concatenates the abstract depth features of some input images in contrast to the pose estimation model 440 concatenating input images. The pose decoder 480 of the depth-pose hybrid model 455 is able to reduce use of extraneous computing resources by sharing training parameters between the depth encoder 470 and the pose decoder 480.

The image synthesis module 180 projects a synthetic frame from one training image to another training image. In projecting of monocular video data, the image synthesis module 180 projects from one temporal image at a first time step to a second temporal image at a second time step by considering both depth of the first temporal image and the relative transformation between the first temporal image time step to the second temporal image time step. The depth is the intermediary variable, whereas the relative transformation is acquired from the Depth and pose models 175.

In additional embodiments, the image synthesis module 180 also considers intrinsics of each image. The intrinsics of an image refer to the geometric properties of the camera used to capture that image, e.g., including the focal length of the camera, the camera's principal point offset, the skew of the camera. In some cases, the intrinsics can be constant for each camera between all images taken or the intrinsics can vary as the camera adjusts its parameters when taking various images. In either case, the intrinsics can be represented as an intrinsic matrix used to also transform the temporal image. In additional embodiments, the image synthesis module 180 also uses the pose of images to warp images with monocular training image data. The image synthesis module 180 transforms the first temporal image to a synthetic frame of the second temporal image.

In one embodiment, the image synthesis module 180 takes a set of three consecutive temporal images from a monocular video and projects from the first temporal image onto the second temporal image time step as a first synthetic frame. The image synthesis module 180 also projects from the third temporal image onto the second temporal image time step as a second synthetic frame. In projecting of stereoscopic image data, the image synthesis module 180 projects from one of a stereoscopic image pair (left image)

to the other of the stereoscopic image pair (right image). The image synthesis module 180—similar to projecting of monocular video data—considers both the depth of the stereoscopic image pair and the pose between the left image and the right image when projecting from one image to the other. However, different from the monocular video data, the pose between the left image and right image is determined by the placement of the two cameras which have captured the stereoscopic image pair. The image synthesis module 180 projects from the left image to the right image as a right synthetic frame and from the right image to the left image as a left synthetic frame.

The error calculation module 185 calculates a differential between the synthetic frames and the temporal images. In an embodiment with calculating a photometric reconstruction error with a single input image, the error calculation module 185 takes a differential between a synthetic frame projected from the single source image and another image as a photometric reconstruction error.

The appearance matching loss module 190 determines the photometric reconstruction error when calculating with multiple input images (also referred to as appearance matching loss). Following the above embodiment with a set of three consecutive temporal images, the error calculation module 185 can calculate a differential between the first synthetic frame and the second temporal image and another differential between the second synthetic frame and the second temporal image. Issues might arise when features present in one temporal image are occluded or disoccluded in an adjacent temporal image. Unfortunately, pixels corresponding to these features can negatively affect training of the depth model. For example, if the correct depth is predicted for such a pixel, the corresponding photometric reconstruction error in an occluded (or disoccluded) source image will likely be very large, inducing a high photometric reconstruction error penalty despite having correctly predicted depth. Such problematic pixels come from two main categories: out-of-view pixels due to egomotion at image boundaries, and occluded (or disoccluded) pixels. In one embodiment, the appearance matching loss module 190 identifies the minimum between the two differentials from the first synthetic frame and the second synthetic frame. In another embodiment, the appearance matching loss module 190 averages the two differentials. Following the above embodiment with the stereoscopic image pairs, the error calculation module 185 can calculate a left differential—between the left synthetic frame and the left image—and a right differential—between the right synthetic frame and the right image. The appearance matching loss module may identify a minimum or calculate an average between the left differential and the right differential. Taking a minimum between two differentials helps to assuage issues that arise with occluded objects present in one view but not another which can avoid creating artifacts. This also proves advantageous in significantly reducing artifacts at image borders, improving the sharpness of occlusion boundaries, and leading to overall better accuracy in the depth estimation.

The scaling module 195 scales depth maps to the resolution of the input images for use in training. Conventionally, the appearance matching loss is calculated as a combination of individual losses at each layer in the depth decoder. The scaling module 195 determines a scaling factor for depth features of a training image to be upsampled based on the resolution of the depth features and on the resolution of the input image. The upsampling can be achieved with a variety of image upsampling techniques including but not limited to bilinear sampling or bicubic sampling. The upsampled depth features are used for generation of synthetic frames and appearance matching loss calculations. Using the upsampled depth features provides improved training results and avoids texture-copy artifacts (i.e., details in the depth map incorrectly transferred from the input images) which can be introduced when computing photometric reconstruction errors on images at the resolution of each layer in the depth decoder.

The masking module 197 masks one or more static features in training image data. A static feature may be defined as a set of pixels in a substantially similar position between two or more images, e.g., in monocular video. For example, an object moving with the same velocity as the camera capturing the monocular video will show up as pixels in a substantially similar position in the monocular video from frame to frame. In other words, an object may appear in the substantially same position between a first image at a first timestamp and a second image at a second timestamp. The masking module 197 accounts for these static features by applying a mask to the static features which filters these static features out when the depth estimation training system 170 is calculating appearance matching loss. Doing so prevents the depth model to determine a static feature in monocular video to be at a grossly inaccurate depth, e.g., tending towards infinity as objects out towards infinity appear static from frame to frame.

In one implementation, the masking module 197 applies a mask based on calculated losses. The masking module 197 calculates a first loss between a first temporal image and a second temporal image. The masking module 197 separately calculates a second loss between a first temporal image and a synthetic frame projected from the second temporal image. The mask may be a Kronecker delta function based on whether the first loss is greater than the second loss. The mask may then be applied to the loss calculations between the synthetic frames and the input images during training of the parameters of the depth model.

The depth estimation training system 170 after training its models and modules with the training images can provide parameters for the depth estimation model 130 to receive a color input image and generate a depth map based on the parameters trained by the depth estimation training system 170 including the depth and pose models 175, the image synthesis module 180, the error calculation module 185, the appearance matching loss module 190, and the scaling module 195. Note that although the depth estimation training system 170 is shown as part of the game server 120 for convenience, some or all of the models may be trained by other computing devices and provided to client devices 110 in various ways, including being part of the operating system, included in a gaming application, or accessed in the cloud on demand.

FIG. 5 is a flowchart describing a general process 500 of training the depth estimation model, in accordance with one or more embodiments. The process 500 results in a plurality of parameters with which the depth estimation model 130 can generate a depth map given an input image.

The depth estimation training system 170 first acquires 510 training image data comprising a combination of a plurality of monocular of temporal images and/or a plurality of stereoscopic image pairs. The monocular video data can be received from a camera on an external device, e.g., the camera assembly 125 on the client device 110. The stereoscopic image pairs can be received from a pair of binocular cameras on an external device, e.g., the camera assembly 125 on the client device 110. In one embodiment, the network interface 105 receives the training image data. The depth estimation training system 170 can store the training image data in various data stores, e.g., monocular video data in a monocular video data store and stereoscopic image pairs in a stereoscopic image data store.

When using monocular video, the depth estimation training system 170 groups 520 the temporal images from the monocular video data into sets of three consecutive temporal images. This step of grouping 520 into sets of three aims to calculate a photometric reconstruction error utilizing two temporal images projected onto the third temporal image. In other embodiments, the depth estimation system 170 may group the temporal images into sets of four or sets of five, etc.

The depth estimation training system 170 inputs 530 each image into a depth model to extract depth features. In one embodiment, the images are input into a depth estimation model (e.g., depth estimation model 410) that extracts depth features as a depth map, e.g., that is at the resolution of the images.

The depth estimation training system 170 inputs 540 the images into a pose decoder extracting a pose for each image. In one embodiment, the images are input into a pose estimation model (e.g., the pose estimation model 440) that extracts pose for an image. In embodiments with a depth-pose hybrid model, abstract depth features determined from a depth encoder (e.g., the depth encoder 470) are concatenated and input into a pose decoder (e.g., the pose decoder 480) to extract the pose for each temporal image. With stereoscopic image pairs, the pose defines or helps define a transformation between the two perspectives of the stereoscopic image pair. In some embodiments, the pose between the two perspectives of the stereoscopic image pair is fixed and/or known. With monocular video data grouped into sets of three consecutive temporal images (e.g., a first, a second, and a third temporal image), the depth estimation training system 170 extracts a relative transformation from the first to the second and another relative transformation from the second to the third.

With depth features and poses, the depth estimation training system 170 projects 550 temporal images onto subsequent temporal images and/or each stereoscopic image onto the other stereoscopic image in the stereoscopic image pair. With each set of three temporal images, the depth estimation training system 170 projects the first temporal image onto the second time step as a first synthetic frame and the third temporal image onto the second time step as a second synthetic frame. The depth estimation training system 170 projects the first temporal image onto the second time step based on the pose of the first temporal image or the relative transformation from the first temporal image to the second temporal image with an intermediary variable being depth of the first temporal image. The depth estimation training system 170 projects the third temporal image onto the second time step likewise with the inverse relative transformation from the second temporal image to the third temporal image also with an intermediary variable being depth of the third temporal image. In one embodiment, the image synthesis module 180 performs the projections from one temporal image to a synthetic frame. With the stereo-scopic image pairs, the depth estimation training system 170 projects a left image of the stereoscopic image pair onto a right image of the stereoscopic image pair as a right synthetic frame and similarly from the right image to the left image as a left synthetic frame. In one embodiment, the image synthesis module 180 performs the projection from the left image to the right image and vice versa.

The depth estimation training system 170 calculates 560 a loss value with an input scale occlusion and motion aware loss function based on a comparison of the synthetic frames and the images. The input scale occlusion and motion aware loss function calculates a loss value for use in training the depth model. The loss function includes a calculation of the photometric reconstruction error per pixel between a synthetic frame and an input image. The loss function may also take into account a minimum photometric reconstruction error between two synthetic frames projected from temporal images from monocular video that are temporally adjacent to another image, as described above in the appearance matching loss module 190. Upsampled depth features (e.g., by the scaling module 195) may also be used during generation of the synthetic frames which would affect the appearance matching loss calculations. The loss function may also implement a mask generated by the masking module 197 that discounts static features when calculating the loss value.

The depth estimation training system 170 trains 570 the depth model by minimizing a photometric reconstruction error per pixel. For the sets of three temporal images, the depth estimation training system 170 identifies a minimum photometric reconstruction error per pixel based on differentials of the first synthetic frame and the second synthetic frame from the second temporal image. In additional embodiments, the depth estimation training system 170 may define an overall error over the depth estimation model based on the synthetic frames and the images. The overall error may be defined, e.g., as an average of the photometric reconstruction errors over a pair of images, an average of the photometric reconstruction errors over multiple or all input images, etc. In minimizing the photometric reconstruction error (or the overall error), the depth estimation training system 170 refines parameters for the depth model. The parameters of the pose model may also be refined as part of minimizing the photometric reconstructions error. In one embodiment, the depth estimation training system 170 calculates the photometric reconstruction error as the absolute minimum between two differentials. In one embodiment, the appearance matching loss module 190 minimizes the photometric reconstruction error in tandem with the image synthesis module 180. In another embodiment, the scaling module 195 scales depth maps of images at varying resolutions to tune parameters of each layer in the depth model. In another embodiment, the masking module 195 identifies one or more regions with static features and masks those regions when computing the photometric reconstruction error.

Depth Estimation Model

Figure 6:
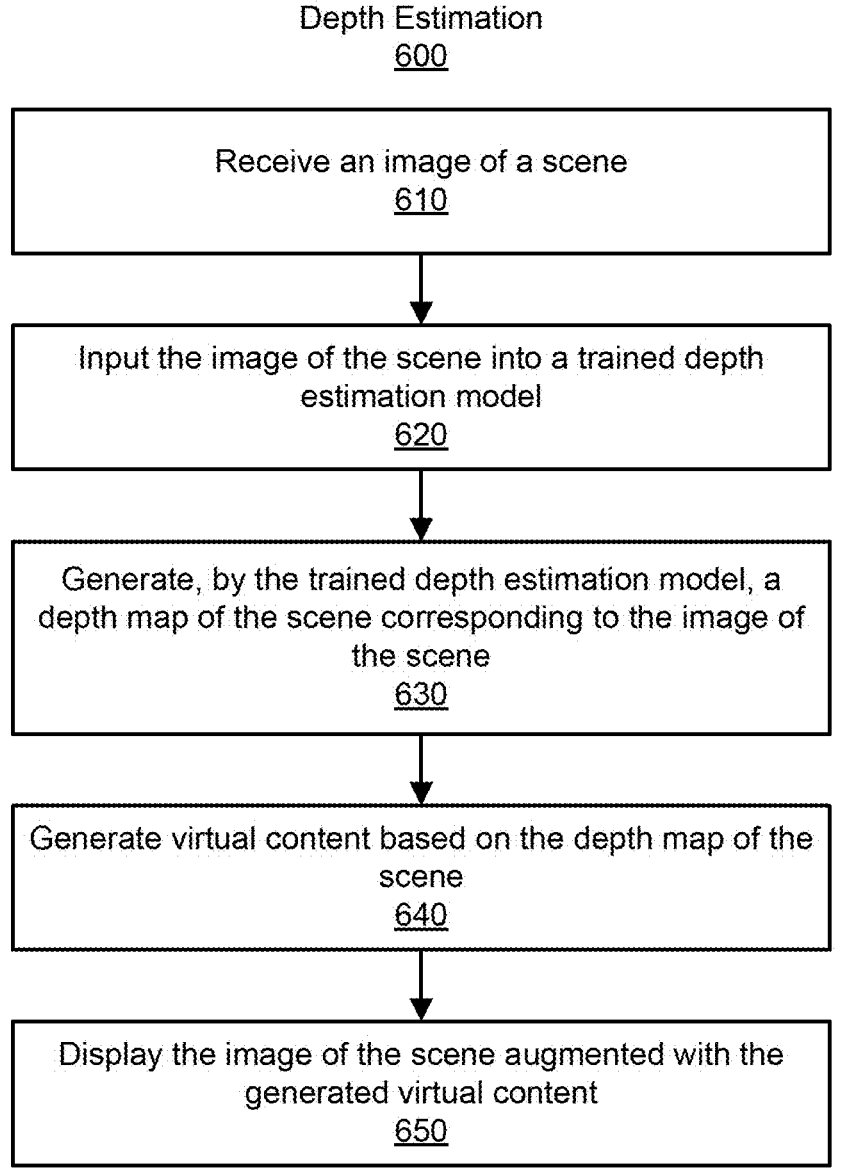
FIG. 6 is a flowchart describing a general process of using a depth estimation model, in accordance with one or more embodiments.

FIG. 6 is a flowchart describing a general process 600 of using a depth estimation model, in accordance with one or more embodiments. The process 600 results in a depth map given an input image. The process 600 may be accomplished by a client device having a trained depth estimation model. The client device can be a generic computing device and may have a camera as well. In some embodiments, the client device is implemented in the parallel reality game described in FIGS. 1-3 above. Although the following description is within the context of a client device, the process 600 may be performed on other computing devices.

The method includes receiving 610 an image of a scene. The image of the scene may be captured by a camera that is a component of the client device or external to the client device. In the context of the parallel reality game, the scene may be of real world locations that may map to virtual locations in the virtual world. The image of the scene may also have intrinsics corresponding to the geometric properties of the camera that captured the image. The image may be a single image captured by the camera. Alternatively, the image may be a frame from video being captured by the camera.

The method includes inputting 620 the image of the scene into a trained depth estimation model. The depth estimation model may be trained by the depth estimation system 170, e.g., via the process 500 of FIG. 5. The depth estimation model receives the image of the scene, and optionally intrinsics of the image as well.

The method includes generating 630, by the trained depth estimation model, a depth map of the scene corresponding to the image of the scene. Each pixel of the depth map has a depth value describing a relative distance of a surface at the corresponding pixel in the image of the scene. The depth estimation receives the image of the scene and outputs the depth map based on the parameters trained according to FIG. 5.

The method includes generating 640 virtual content based on the depth map of the scene. The virtual content can be sourced from content for the parallel reality game, e.g., stored in the game database 115. The virtual content generated may be augmented reality content that can be augmented onto the image of the scene. For example, a virtual character is generated that can move about the scene with understanding of depth of the scene. In one instance, the virtual character can grow in size as the virtual character is walking on a street towards the user. In another instance, the virtual character can duck behind a tree where a portion of the virtual character is then occluded by the tree.

The method includes displaying 650 the image of the scene augmented with the virtual content. The client device includes an electronic display. The electronic display can provide a constant feed of video captured by the camera with augmented virtual content.

Following the example above, the parallel reality game might provide interacting with the virtual character as an objective. In order to interact with the virtual character, a user of the mobile device may need to move their mobile device around while keeping the virtual character in a field of view of the camera. As the user moves the mobile device around, the mobile device can continually capture video or image data which can be used to iteratively generate depth information of the scene as the scene is changing with the user's movement of the mobile device. The mobile device can update the video feed on the display while also updating the virtual character based on generated depth information so that the user would perceive the virtual character as always interacting appropriately within the scene, e.g., not walking through objects, not having portions that are cut off without any object occluding those portions, etc.

Example Computing System

Figure 7:
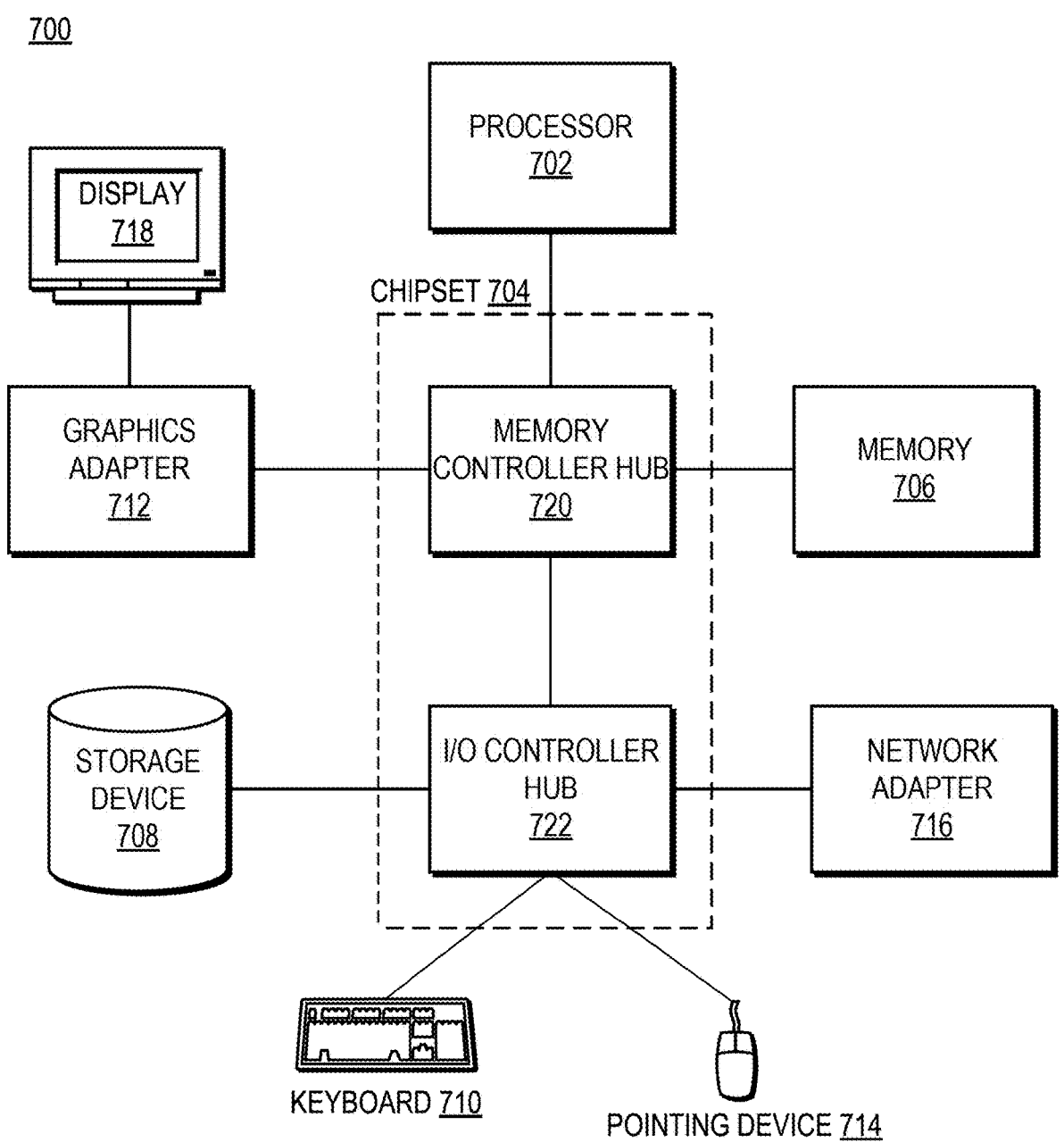
FIG. 7 is an example architecture of a computing device, in accordance with one or more embodiments.

FIG. 7 is an example architecture of a computing device, according to an embodiment. Although FIG. 7 depicts a high-level block diagram illustrating physical components of a computer used as part or all of one or more entities described herein, in accordance with an embodiment, a computer may have additional, less, or variations of the components provided in FIG. 7. Although FIG. 7 depicts a computer 700, the figure is intended as functional description of the various features which may be present in computer systems than as a structural schematic of the implementations described herein. In practice, and as recognized by those of ordinary skill in the art, items shown separately could be combined and some items could be separated.

Illustrated in FIG. 7 are at least one processor 702 coupled to a chipset 704. Also coupled to the chipset 704 are a memory 706, a storage device 708, a keyboard 710, a graphics adapter 712, a pointing device 714, and a network adapter 716. A display 718 is coupled to the graphics adapter 712. In one embodiment, the functionality of the chipset 704 is provided by a memory controller hub 720 and an I/O hub 722. In another embodiment, the memory 706 is coupled directly to the processor 702 instead of the chipset 704. In some embodiments, the computer 700 includes one or more communication buses for interconnecting these components. The one or more communication buses optionally include circuitry (sometimes called a chipset) that interconnects and controls communications between system components.

The storage device 708 is any non-transitory computer-readable storage medium, such as a hard drive, compact disk read-only memory (CD-ROM), DVD, or a solid-state memory device or other optical storage, magnetic cassettes, magnetic tape, magnetic disk storage or other magnetic storage devices, magnetic disk storage devices, optical disk storage devices, flash memory devices, or other non-volatile solid state storage devices. Such a storage device 708 can also be referred to as persistent memory. The pointing device 714 may be a mouse, track ball, or other type of pointing device, and is used in combination with the keyboard 710 to input data into the computer 700. The graphics adapter 712 displays images and other information on the display 718. The network adapter 716 couples the computer 700 to a local or wide area network.

The memory 706 holds instructions and data used by the processor 702. The memory 706 can be non-persistent memory, examples of which include high-speed random access memory, such as DRAM, SRAM, DDR RAM, ROM, EEPROM, flash memory.

As is known in the art, a computer 700 can have different and/or other components than those shown in FIG. 7. In addition, the computer 700 can lack certain illustrated components. In one embodiment, a computer 700 acting as a server may lack a keyboard 710, pointing device 714, graphics adapter 712, and/or display 718. Moreover, the storage device 708 can be local and/or remote from the computer 700 (such as embodied within a storage area network (SAN)).

As is known in the art, the computer 700 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 708, loaded into the memory 706, and executed by the processor 302.

Additional Considerations

Additional discussion of embodiments are found in the Appendix of U.S. Provisional Application No. 62/673,045 titled, "Digging Into Self-Supervised Monocular Depth Estimation", which is herein incorporated by reference in its entirety.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B Is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for verifying an account with an on-line service provider corresponds to a genuine business. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by the following claims.

What is claimed is:

1. A non-transitory computer-readable storage medium storing:

a depth-pose hybrid model including a depth encoder and a pose decoder, wherein the pose decoder is configured to receive input based on output from the depth encoder, the depth-pose hybrid model manufactured by a process comprising:

acquiring a set of images;

applying the depth-pose hybrid model to generate depth maps and poses for the set of images based on parameters of the depth-pose hybrid model;

generating synthetic frames based on the depth maps and the poses for the set of images;

calculating a loss value with a loss function based on a comparison of the synthetic frames and the set of images; and adjusting the parameters of the depth-pose hybrid model based on the loss value; and instructions that, when executed by a computing device, cause the computing device to apply the depth-pose hybrid model to an image of a scene to generate a depth map of the scene.

2. The non-transitory computer-readable storage medium of claim 1, wherein the depth encoder and the pose decoder share at least some of the parameters of the depth-pose hybrid model.

3. The non-transitory computer-readable storage medium of claim 1, wherein generating the depth maps and the poses for the set of images comprises:

applying the depth encoder to the set of images to generate the depth maps; and applying the pose decoder to the depth maps to generate the poses.

4. The non-transitory computer-readable storage medium of claim 1, wherein the set of images comprises monocular video with each image of the monocular video captured at a corresponding timestamp, wherein generating the synthetic frames comprises:

for images of the monocular video, generating synthetic frames at adjacent timestamps.

5. The non-transitory computer-readable storage medium of claim 4, wherein calculating the loss value with the loss function comprises:

calculating, for images of the monocular video, differentials between generated synthetic frames and images of the monocular video with matching timestamps.

6. The non-transitory computer-readable storage medium of claim 1, wherein:

the set of images includes a first image at a first timestamp, a second image at a second timestamp, and a third image at a third timestamp, a first synthetic frame is generated at the second timestamp with the first image and a second synthetic frame is generated at the second timestamp with the third image, and calculating the loss value with the loss function further comprises:

calculating a first set of differentials between the first synthetic frame and the second image and a second set of differentials between the second synthetic frame and the second image; and for each pixel of the second image, identifying a minimum differential between the first set of differentials and the second set of differentials, wherein the loss value is based on the minimum differentials.

7. The non-transitory computer-readable storage medium of claim 5, wherein calculating the loss value with the loss function further comprises:

identifying one or more static features in the monocular video, wherein the loss value is based on filtering out the differentials of the one or more static features.

8. The non-transitory computer-readable storage medium of claim 7, wherein identifying the one or more static features in the monocular video comprises:

identifying a region in a first image at a first timestamp of the monocular video and in a second image at a second timestamp of the monocular video;

determining whether an object is in a similar position between the first image and the second image; and in response to determining that the object is in the similar position between the first image and the second image, defining the region as a static feature.

9. The non-transitory computer-readable storage medium of claim 1, wherein the set of images comprises stereoscopic image pairs with each stereoscopic image pair captured by a stereoscopic pair of cameras, wherein generating the synthetic frames comprises:

for each stereoscopic image pair, generating a synthetic frame based on a first image of the stereoscopic image pair.

10. The non-transitory computer-readable storage medium of claim 9, wherein adjusting the parameters of the depth-pose hybrid model based on the comparison of the synthetic frames and the set of images comprises:

calculating, for each stereoscopic image pair, a differential between the generated synthetic frame and a second image of the stereoscopic image pair; and adjusting the parameters to minimize the differentials.

11. A computer-implemented method comprising:

receiving an image of a scene;

inputting the image into a depth-pose hybrid model including a depth encoder and a pose decoder, wherein the pose decoder is configured to receive input based on output from the depth encoder, the depth-pose hybrid model trained with a process including:

acquiring a set of images;

inputting the set of images into the depth-pose hybrid model to extract depth maps and poses for the set of images based on parameters of the depth-pose hybrid model;

generating synthetic frames based on the depth maps and the poses for the set of images;

calculating a loss value with a loss function based on a comparison of the synthetic frames and the set of images; and adjusting the parameters of the depth-pose hybrid model based on the comparison of the synthetic frames and the set of images; and generating, by the depth-pose hybrid model, a depth map of the scene corresponding to the image of the scene.

12. The computer-implemented method of claim 11, wherein the depth encoder and the pose decoder share at least some of the parameters of the depth-pose hybrid model.

13. The computer-implemented method of claim 11, wherein generating the depth maps and the poses for the set of images comprises:

applying the depth encoder to the set of images to generate the depth maps; and applying the pose decoder to the depth maps to generate the poses.

14. The computer-implemented method of claim 11, wherein the set of images comprises monocular video with each image of the monocular video captured at a corresponding timestamp, wherein generating the synthetic frames comprises:

for images of the monocular video, generating synthetic frames at adjacent timestamps.

15. The computer-implemented method of claim 14, wherein calculating the loss value with the loss function comprises:

calculating, for images of the monocular video, differentials between generated synthetic frames and images of the monocular video with matching timestamps.

16. The computer-implemented method of claim 11, wherein:

the set of images includes a first image at a first timestamp, a second image at a second timestamp, and a third image at a third timestamp, a first synthetic frame is generated at the second timestamp with the first image and a second synthetic frame is generated at the second timestamp with the third image, and calculating the loss value with the loss function further comprises:

calculating a first set of differentials between the first synthetic frame and the second image and a second set of differentials between the second synthetic frame and the second image; and for each pixel of the second image, identifying a minimum differential between the first set of differentials and the second set of differentials, wherein the loss value is based on the minimum differentials.

17. The computer-implemented method of claim 11, further comprising:

displaying the image of the scene augmented with virtual content based on the depth map of the scene.

18. A non-transitory computer-readable storage medium storing instructions that, when executed by a computing device, cause the computing device to perform operations comprising:

receiving an image of a scene;

inputting the image into a depth-pose hybrid model including a depth encoder and a pose decoder, wherein the pose decoder is configured to receive input based on output from the depth encoder, the depth-pose hybrid model trained with a process including:

acquiring a set of images;

inputting the set of images into the depth-pose hybrid model to extract depth maps and poses for the set of images based on parameters of the depth-pose hybrid model;

generating synthetic frames based on the depth maps and the poses for the set of images;

calculating a loss value with a loss function based on a comparison of the synthetic frames and the set of images; and adjusting the parameters of the depth-pose hybrid model based on the comparison of the synthetic frames and the set of images; and generating, by the depth-pose hybrid model, a depth map of the scene corresponding to the image of the scene.

19. The non-transitory computer-readable storage medium of claim 18, wherein:

the set of images includes a first image at a first timestamp, a second image at a second timestamp, and a third image at a third timestamp, a first synthetic frame is generated at the second timestamp with the first image and a second synthetic frame is generated at the second timestamp with the third image, and calculating the loss value with the loss function further comprises:

calculating a first set of differentials between the first synthetic frame and the second image and a second set of differentials between the second synthetic frame and the second image; and for each pixel of the second image, identifying a minimum differential between the first set of differentials and the second set of differentials, wherein the loss value is based on the minimum differentials.

20. The non-transitory computer-readable storage medium of claim 18:

wherein the set of images comprises monocular video with each image of the monocular video captured at a corresponding timestamp;

wherein generating the synthetic frames comprises: for images of the monocular video, generating synthetic frames at adjacent timestamps;

wherein calculating the loss value with the loss function comprises: calculating, for images of the monocular video, differentials between generated synthetic frames and images of the monocular video with matching timestamps;

wherein calculating the loss value with the loss function further comprises: identifying one or more static features in the monocular video; and wherein the loss value is based on filtering out the differentials of the one or more static features.

21. The non-transitory computer-readable storage medium of claim 1:

wherein the depth maps generated by the depth-pose hybrid model have lower resolutions than corresponding images of the set of images; and wherein the process further comprises, prior to generating the synthetic frames, upsampling the depth maps to resolutions of corresponding images of the set of images.

* * * * *